(12) United States Patent
Titz

(10) Patent No.: US 10,155,461 B2
(45) Date of Patent: Dec. 18, 2018

(54) VERTICAL SUSPENSION SYSTEM FOR A VEHICLE SEAT HAVING A CHECK BELT

(71) Applicant: Isringhausen GmbH & Co. KG, Lemgo (DE)

(72) Inventor: Winfried Titz, Detmold (DE)

(73) Assignee: ISRINGHAUSEN GMBH & CO. KG., Lemgo (DE)

( * ) Notice: Subject to any disclaimer, the term of this patent is extended or adjusted under 35 U.S.C. 154(b) by 4 days.

(21) Appl. No.: 15/646,518

(22) Filed: Jul. 11, 2017

(65) Prior Publication Data

US 2018/0015856 A1    Jan. 18, 2018

(30) Foreign Application Priority Data

Jul. 12, 2016    (DE) .................... 10 2016 008 378

(51) Int. Cl.
*B60N 2/50*    (2006.01)
(52) U.S. Cl.
CPC ............. *B60N 2/508* (2013.01); *B60N 2/502* (2013.01)
(58) Field of Classification Search
CPC ........ B60N 2/508; B60N 2/502; B60N 2/505; B60N 2/605; B60N 2/54; B60N 2/509; B60N 2/705; B60N 2/50
USPC ....... 248/636, 588, 550, 631, 542, 560, 562, 248/157, 419, 564, 421, 406.2, 161, 424, 248/425, 429, 431, 575, 561, 587, 584; 297/452.18, 344.15, 217.1, 309, 311; 267/64.19

See application file for complete search history.

(56) References Cited

U.S. PATENT DOCUMENTS 5,058,852 A * 10/1991 Meier .................... B60N 2/501
                                                                248/406.2
5,169,112 A * 12/1992 Boyles ................... B60N 2/501
                                                                248/406.2

(Continued)

*Primary Examiner* — Nkeisha Smith
(74) *Attorney, Agent, or Firm* — Abelman, Frayne & Schwab

(57) ABSTRACT

The invention relates to a vertical suspension system 1 for a vehicle seat having a lower guide frame 2 and an upper guide frame 3, between which there is disposed a lever arrangement that comprises an inner lever 7 and an outer lever 8, which are connected to each other via a scissor joint 16, wherein the inner lever 7 and the outer lever 8 are connected to the lower guide frame 2 and to the upper guide frame 3 in each case via floating bearings and fixed bearings 10, 11, wherein realized on the lower guide frame 2 there is a lower crosspiece 5, which, at its lower end that faces away from the upper guide frame 3, has a rounded return region 19, wherein the lower fixed bearing 10 has a lower axle 9, which extends parallel to the lower crosspiece 5 and is opposite the latter, wherein realized on the upper guide frame 3 there is an upper crosspiece 6, having a belt band 12; 13, which is fastened to the upper crosspiece 6 in an upper fastening region 25 and to the lower crosspiece 5 in a lower fastening region 24, wherein the belt band 12; 13, in its lower fastening region 24, is realized in the form of a loop, and this lower fastening region 24 encompasses a retaining element 17, which is connected to the lower crosspiece 5, wherein the belt band 12; 13, between its lower fastening region 24 and its upper fastening region 25, is routed via the return region 19 and encompasses the lower axle 9.

8 Claims, 5 Drawing Sheets

(56) References Cited

U.S. PATENT DOCUMENTS

Figure 1:
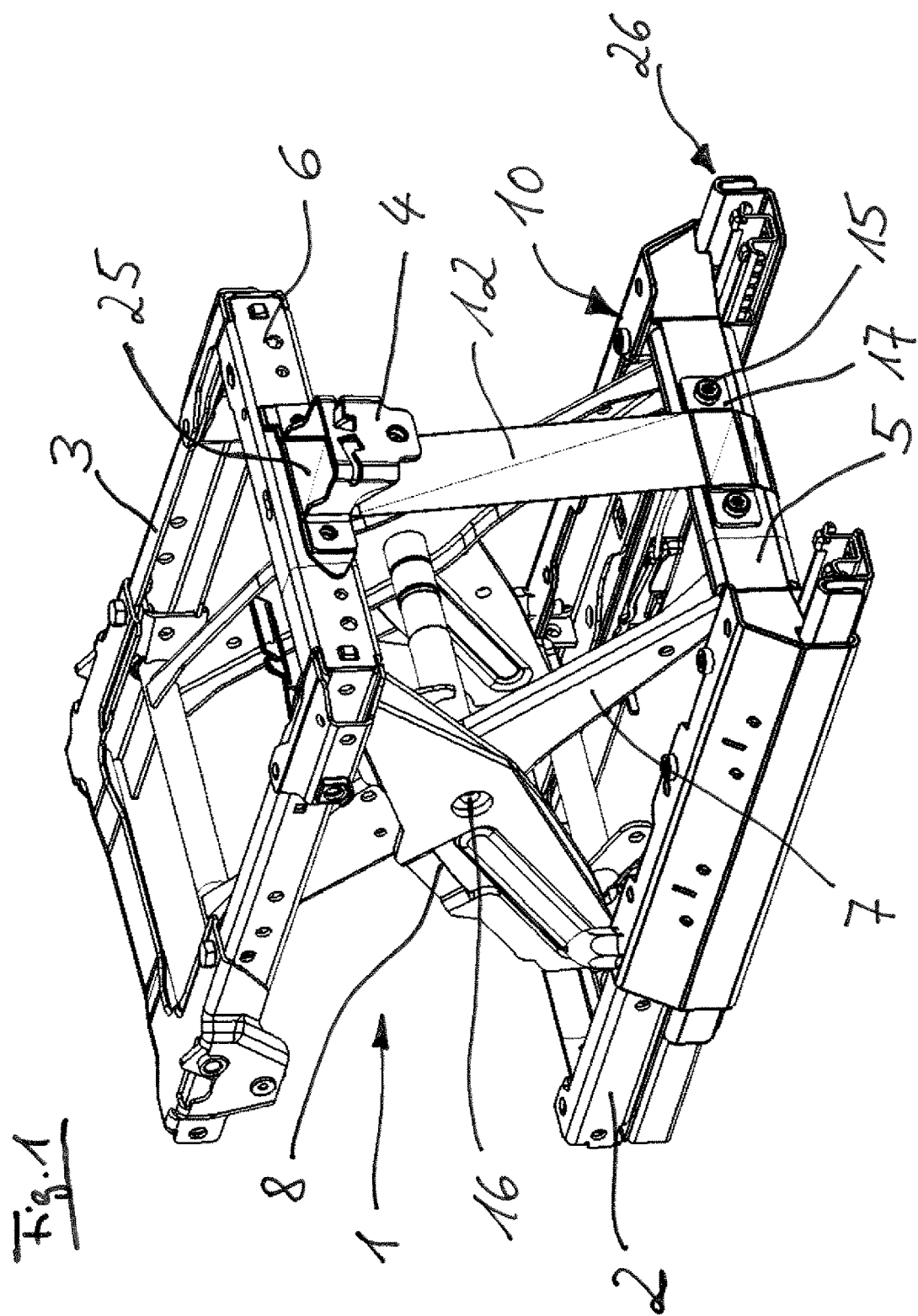

| | | | | |
|---|---|---|---|---|
| 5,799,922 A * | 9/1998 | Timms | ............... | B60N 2/501 248/564 |
| 6,264,163 B1 * | 7/2001 | Ivarsson | ............ | B60N 2/501 248/550 |
| 6,644,737 B2 * | 11/2003 | Kohl | .................. | B60N 2/502 248/542 |
| 7,575,206 B2 * | 8/2009 | Meier | ............... | B60N 2/002 248/157 |
| 9,566,886 B2 * | 2/2017 | Lorey | ............... | B60N 2/502 |
| 2004/0212242 A1 | 10/2004 | Gryp | | |

* cited by examiner

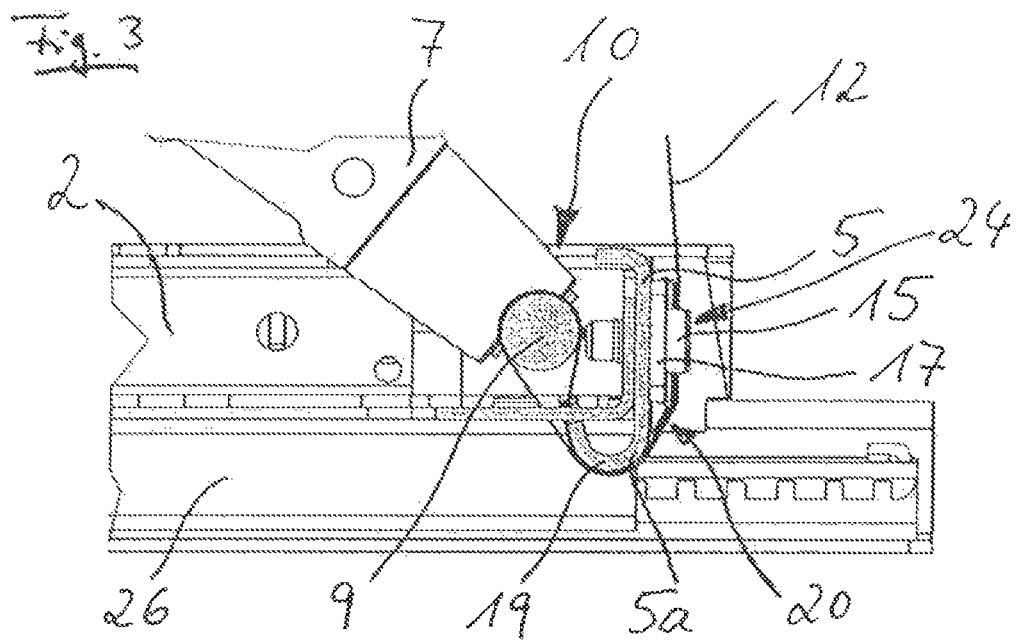
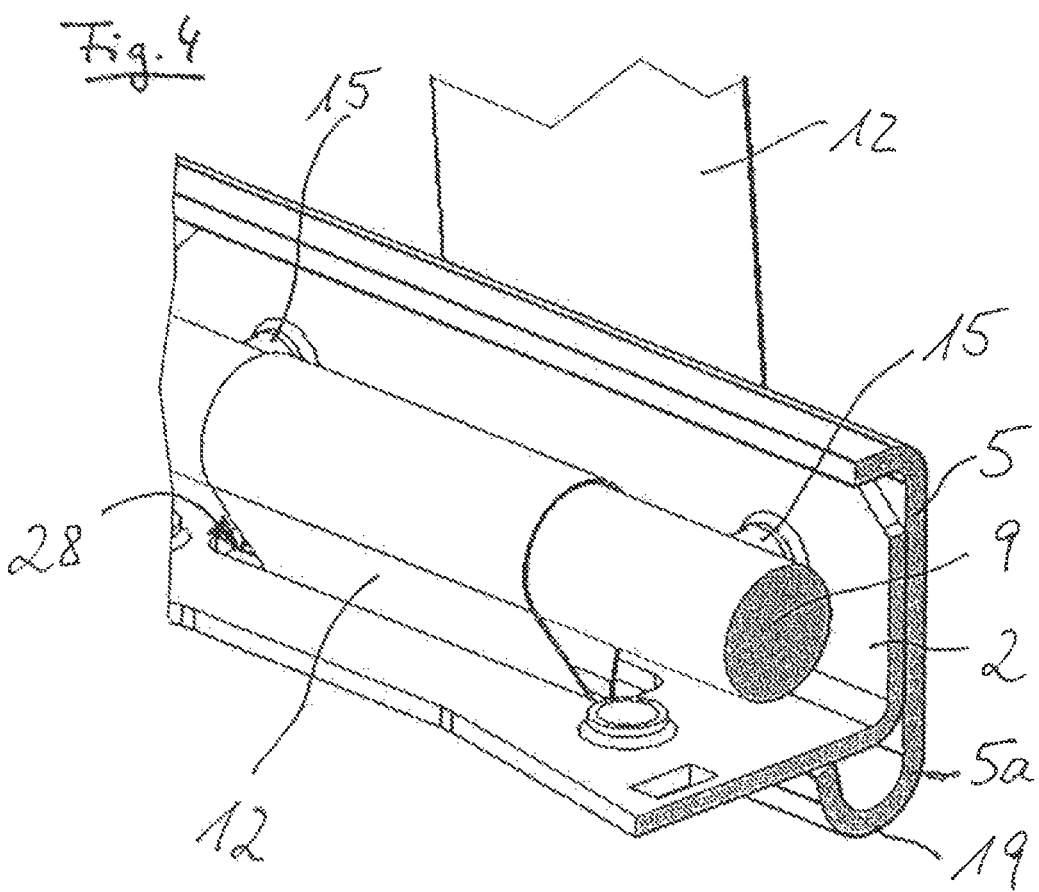

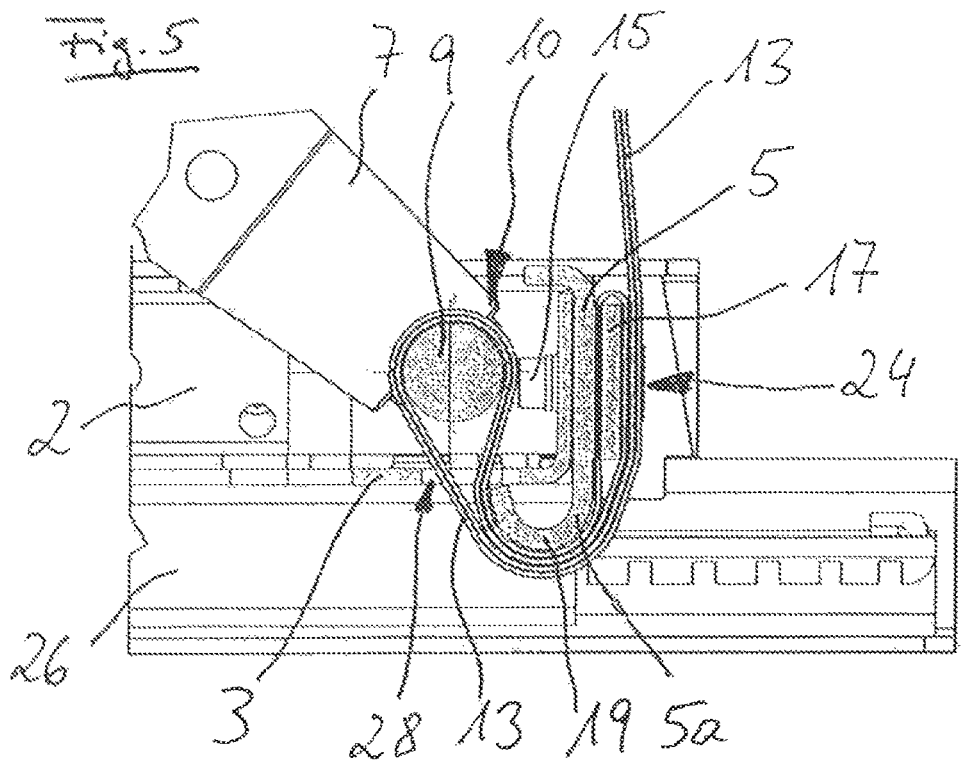
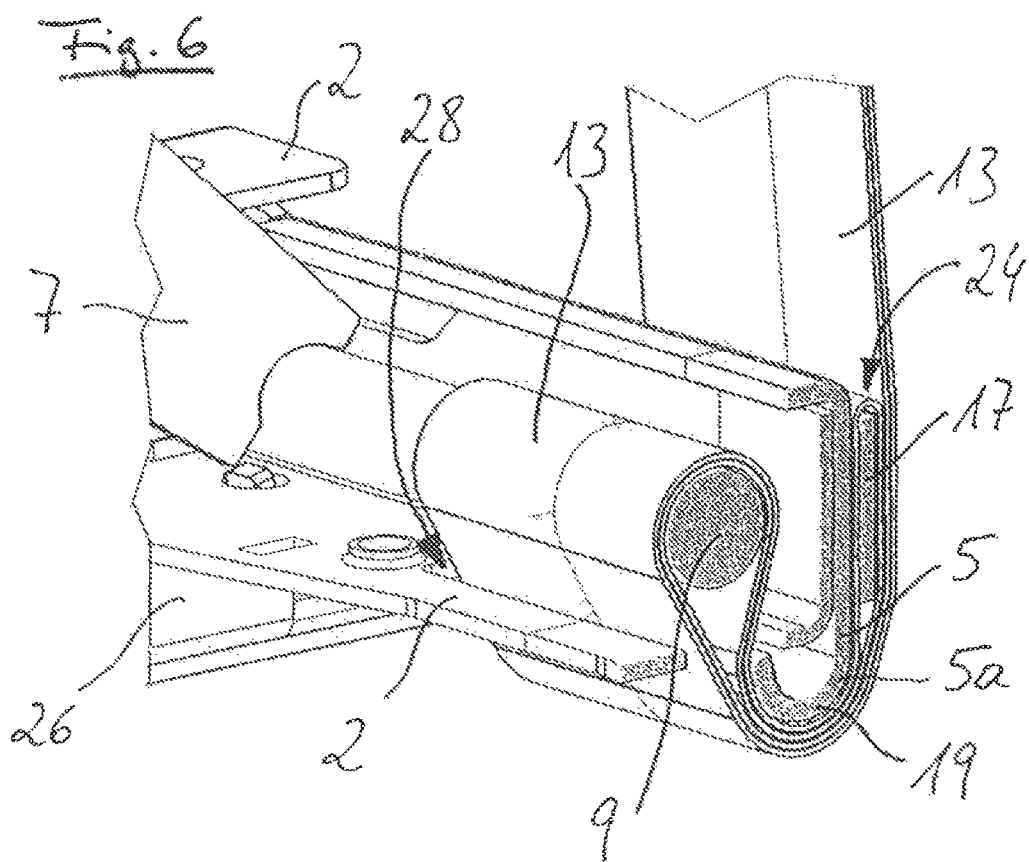

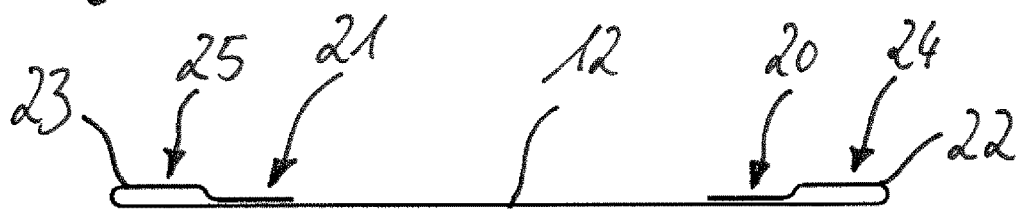
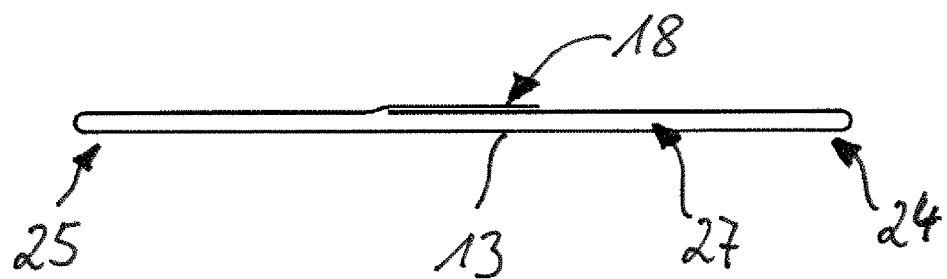
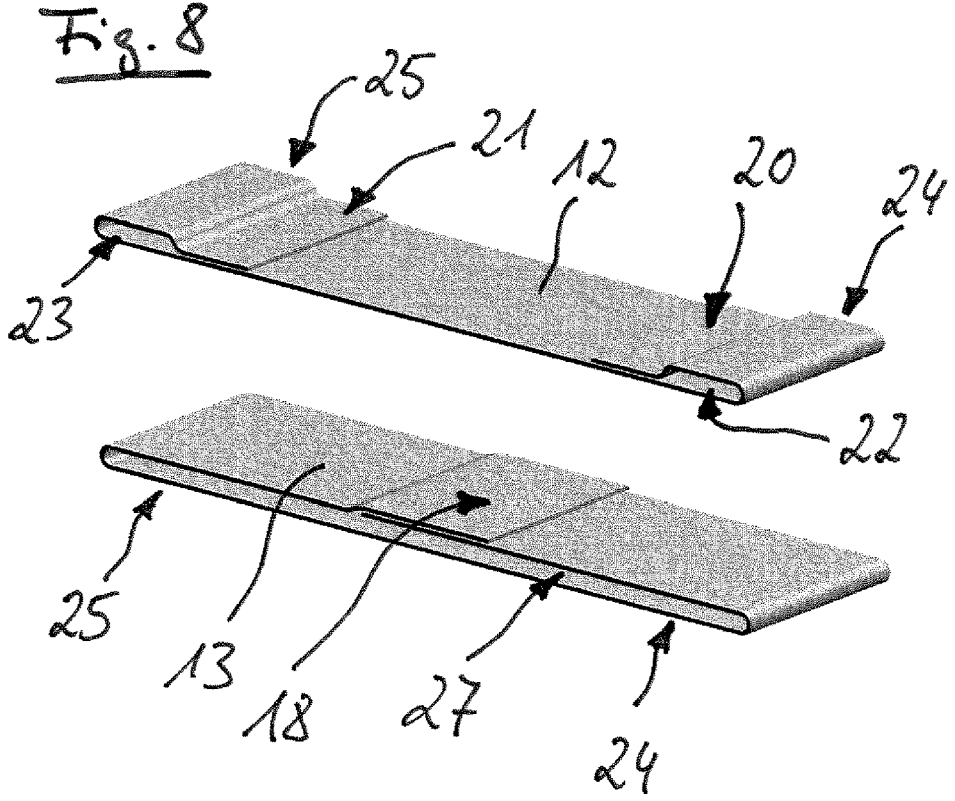

VERTICAL SUSPENSION SYSTEM FOR A VEHICLE SEAT HAVING A CHECK BELT

The invention relates to a vertical suspension system for a vehicle seat, which has a scissor suspension arrangement, and to a check belt, which connects the upper and lower guide frame of the scissor suspension arrangement to each other.

Seats having vertical suspension systems for coupling out harmful oscillations that are caused by the road usually have integrated three-point belt systems. The vehicle fastening points in this case are subject to a relative movement, which constitutes an unacceptable loss of comfort.

Belt and restraint systems become effective in dynamic acceleration and deceleration events. In this case, all forces that result from the mass action of the seat user must be introduced into the seat system through the belt system; this is in addition to the mass action of the seat system itself. All this must be reliably diverted by the seat system into the cabin floor of the vehicle by degrees of freedom that are based on comfort, such as, according to the present application, by a vertical suspension system and a horizontal adjustment by means of a sliding seat guide. The state of the art includes inexpensive, light and efficient check belt arrangements for transferring the occurring forces in the vertical suspension system and for height limitation.

Conventional check belt arrangements provide an efficient connection from the upper guide frame of the vertical suspension system—preferably from a fastening point of the belt roller—to the lower guide frame. The introduced belt forces in this case are absorbed at a crosspiece of the lower guide frame, and from there are transferred via the sliding seat guide arrangement, which forms a further degree of freedom, into the vehicle floor.

Typical vertical suspension systems have, within the two guide frames (upper and lower), a respective fixed bearing region and a respective floating bearing region for receiving the lever arrangement, which each have an inner lever and an outer lever, which are coupled to each other via a scissor joint. The lever arrangement serves to maintain the desired vertical degree of freedom while, at the same time, coupling out and isolating unwanted oscillations. Preferably, the floating bearings are disposed at the front in the direction of travel, and the fixed bearings are disposed at the rear in the direction of travel. Only the fixed bearings can effectively discharge forces in a horizontal direction, all horizontal forces becoming operative in the lower (rear) fixed bearing; in addition to this there are the resulting forces, which become operative as a result of anticlockwise or clockwise rotating moments in the overall system. Mountable retaining elements are also known, for securing the lower fixed bearings; in this case, the axle of the lever is additionally secured against leaving the fixed bearing position.

All forces thus act firstly on the upper guide frame, and must be transferred from there, through the lever arrangement and through the check belt arrangement, into the lower guide frame. Conventional check belt arrangements connect the crosspieces of the upper and the lower guide frame to each other in a simple manner in that, frequently, a single-layer belt band is fixedly attached by one end to the upper crosspiece, and by its other end to the lower crosspiece, but double-layer check belts are also known.

The object of the invention is therefore to present a vertical suspension system having a check belt, which transfers the forces occurring at the upper guide frame—not only the vertical, but also the horizontal, forces—into the lower guide frame in as simple a form as possible and, in so doing, at the same time secures the axle of the lever, mounted in the base frame, against leaving the fixed bearing position under load.

This object is achieved by a vertical suspension system having the features of claim 1. The belt band, according to the invention, of a check belt, which differs from the belt bands known from the state of the art in its design, routing and fastening, achieves the effect that, with little additional resource requirement on the suspension system—the round return region on the underside of the lower crosspiece, and the retaining element, likewise on the lower crosspiece—and a slight change to the routing of the belt band—around the lower axle—and fastening thereof to the suspension system—by means of a loop, realized on the belt band, over the retaining element—the horizontal and vertical forces occurring at the upper guide frame—the latter forces occurring upon a limit stop at the upper oscillation point—are reliably transferred with little resource requirement. Owing to the fixed connection of the retaining element to the lower crosspiece, the horizontal forces in this case are introduced into the lower guide frame, of which the lower crosspiece is a constituent part, and from there directly into the vehicle floor, to which the lower guide frame is connected in a form-fitting manner.

An advantageous development of the invention provides that the retaining element is attached to the side that faces rearward away from the lower axle. This achieves the effect that the belt band bears against a large portion of the surface of the lower axle. The belt band can absorb and transfer exclusively tensile forces; only in such an arrangement can all forces introduced here be transferred, as tensile forces, directly from the lower axle to the retaining element.

A further advantageous development of the invention provides that the retaining element is realized as a retaining plate, which is connected to the lower crosspiece via a screwed connection or rivets. During assembly, therefore, the loop of the belt band can be slid over the plate, and the plate subsequently securely connected to the lower crosspiece. This means a secure connection with, at the same time, extremely simple assembly.

A further advantageous development of the invention provides that a fastening device for a belt roller is attached to the upper crosspiece in the region of the upper fastening region. As a result, the device known from the state of the art does not have to be altered at this point, or has to be altered only slightly.

A further advantageous development of the invention provides that the belt band as a whole is realized as a single loop, in which the two ends of the belt band are inseparably connected to each other in a single seam region. On the one hand, such a belt can be produced very easily, and on the other hand it is thereby possible to achieve a design of the check belt that is reliable and, in respect of the forces that are applied during use, tear-resistant.

A further advantageous development of the invention provides that the belt band is routed, doubled in each case, around the lower axle and between lower crosspiece and upper crosspiece, and fourfold around the return region. As a result, significantly greater forces can be absorbed and transferred than if only one layer were routed around the lower axle. This arrangement effects a transmission ratio in the manner of a pulley, and consequently twice the retaining forces act on the load-exposed lower axle at the fixed bearing than in the connecting region between upper and base frame.

A further advantageous development of the invention provides that the lower fastening region of the belt band is realized as a lower fastening loop and the upper fastening region of the belt band is realized as an upper fastening loop, in that the respective ends of the belt band are inseparably connected to the belt band in a lower seam region and an upper seam region. As a result, less material is required for the belt band than in the case of the embodiment of the check belt as a single loop, described further above. In comparison with this above embodiment, however, two seams must be produced, which involves a greater resource requirement.

A further advantageous development of the invention provides that the belt band is routed, singly in each case, around the lower axle and between lower crosspiece and upper crosspiece, and doubled around the return region. As a result, in comparison with the embodiment of the check belt described further above, with double routing around the lower axle, a belt band of lesser length is required, since it does not have to be routed doubled and fourfold in the regions in question, but only singly and doubled. However, the consequently possible forces that can be absorbed are less.

A further advantageous development of the invention provides that the fixed bearings are disposed at the rear in the direction of travel. As a result, a suspension system can be used as a starting point for the invention, as is predominantly used in the state of the art, resulting in a lesser resource requirement in respect of an otherwise necessary redesign of a suspension system. Owing to the position of the belt fastening points at the interface between the seat frame and back or, in the case of belt-integrated seats, on the back itself—i.e. in the rearward region of the seat structure—the forces introduced there can be absorbed and transferred directly in the suspension system. In the case of the fixed bearings being disposed at the front, by contrast, further components, which would necessitate the corresponding reinforcements, would be added to the flow of forces.

Further advantages and details of the invention are explained on the basis of the embodiment example represented in the figures. There are shown in FIG. 1 a first embodiment example, in an isometric representation, of a vertical suspension system according to the invention having a single-layer belt band, FIG. 2 a sectional model of the first embodiment example, FIG. 3 a detail view of the first embodiment example in the region of the lower fastening region, FIG. 4 an isometric representation of the lower fastening region of the first embodiment example according to FIG. 3, FIG. 5 a detail view of a second embodiment example having a two-layer belt band, in the region of the lower fastening region, according to FIG. 3, FIG. 6 an isometric representation of the lower fastening region of the second embodiment example according to FIG. 5, FIG. 7 a schematic side view of the two belt variants of the two embodiment examples, and FIG. 8 an isometric view of the two belt variants according to FIG. 7.

Figure 2:
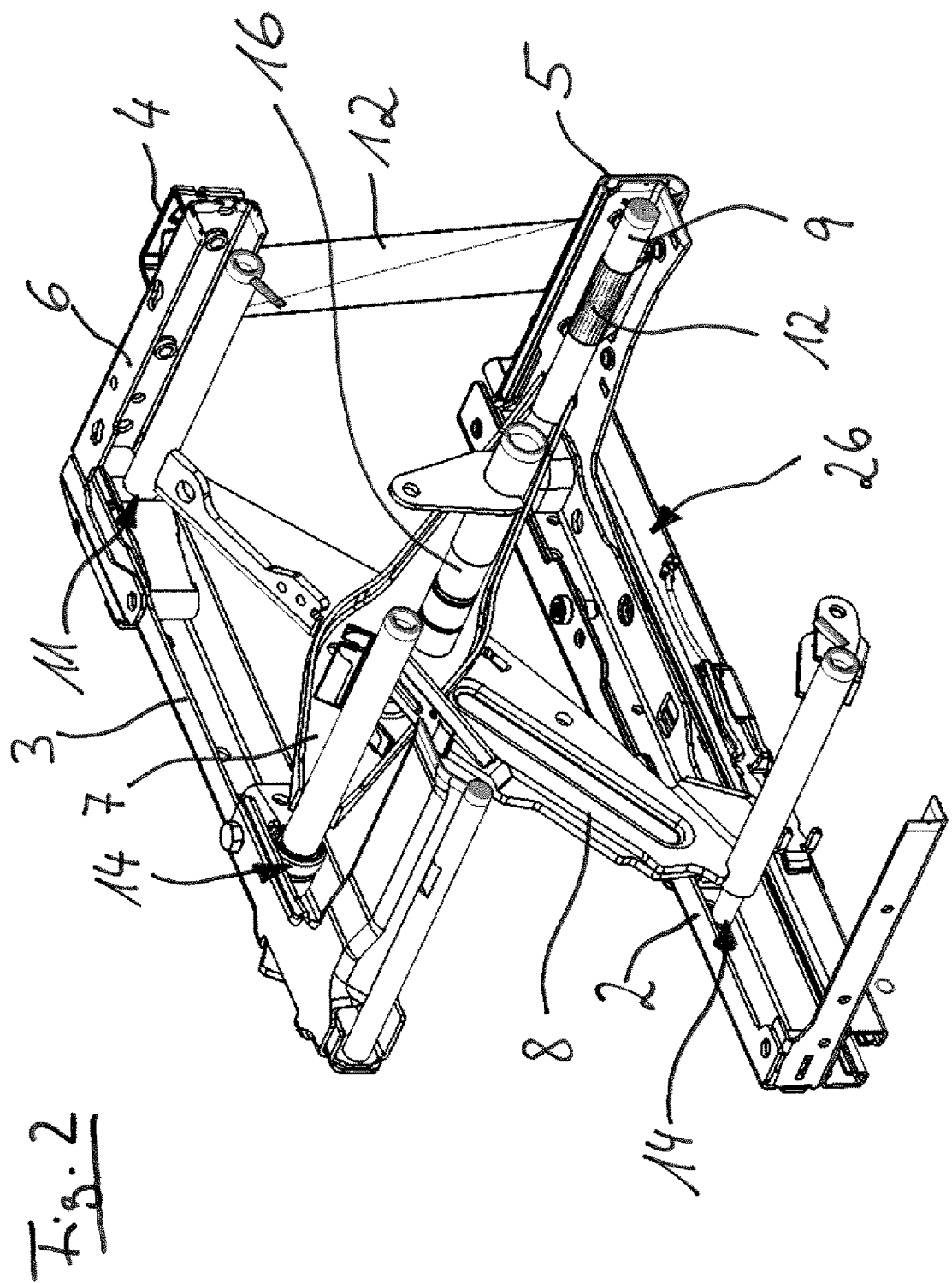

Represented in FIGS. 1 and 2, from differing viewing angles, is a first embodiment of a vertical suspension system 1 according to the invention for a vehicle seat, FIG. 2 showing a sectional model. These two figures are explained together in the following.

The vertical suspension system 1 according to the invention comprises a scissor-type suspension device, known from the state of the art, which has an upper guide frame 3 and a lower guide frame 2, disposed between which is a lever arrangement, having an inner lever 7 and an outer lever 8 that is connected to the latter via a scissor joint 16. The operating principle of such a lever arrangement is known to a person skilled in the art. This lever arrangement has two floating bearings 14 at the front in the direction of travel and, at the rear in the direction of travel (this being the right-hand side in FIGS. 1 and 2), has an upper fixed bearing 11 between the outer lever 8 and the upper guide frame 3, and a lower fixed bearing 10 between the inner lever 7 and the lower guide frame 2. The lower fixed bearing 10 is realized such that it has a solid lower axle 9 parallel to the scissor joint 16. An upper crosspiece 6, disposed centrally on which there is a fastening device 4 for a belt roller, is realized on the upper guide frame 3, and a lower crosspiece 5 is realized on the lower guide frame 2—each being realized at the rear end in the direction of travel.

The entire vertical suspension system 1 is connected to a sliding seat guide 26, as is known from the state of the art. This sliding seat guide 26, in turn, is fixedly connected to the vehicle floor.

Disposed between upper guide frame 3 and lower guide frame 2 is a check belt. The check belt according to the invention of the first embodiment example is realized as a single belt band 12. At its upper end, the single belt band 12 is fixedly connected, in its upper fastening region 25, to the upper crosspiece 6, in the region of the fastening device 4 for the belt roller. In its lower fastening region 24 (see FIG. 3), the single belt band 12 is connected to the lower crosspiece 5 via a retaining element, in the form of a retaining plate 17, which is fixedly connected to the lower crosspiece 5 by means of screwed connections 15. Concerning the more detailed design of the single belt band 12, its routing—in particular in the region of the lower crosspiece 5—and the design of the lower crosspiece 5, there follow observations relating to FIGS. 3 and 4.

Shown in FIGS. 3 and 4, from differing viewing angles, are sectional representations in the region of the lower crosspiece 5. These two figures are explained together in the following.

The vertical suspension system 1 sits with its lower guide frame 2 in the sliding seat guide 26. The inner lever 7 is fixedly connected to the lower axle 9, such that, in the case of vertical oscillations of the vertical suspension system 1, the lower axle 9 rotates in the lower fixed bearing 10.

For the purpose of transmitting the belt forces—that are introduced via the fastening device 4 of the belt roller (see FIGS. 1 and 2) into the upper guide frame 3—into the lower guide frame 2 and, from there, via the sliding seat guide 26, into the vehicle floor, the single belt band 12 of the check belt is provided. In its upper fastening region 25 it is attached to the upper crosspiece 6 of the upper guide frame 3 (see FIG. 1), and in its lower fastening region 24 it is attached to the lower crosspiece 5, by means of a retaining plate 17, together with screwed connections 15, as was already described above in connection with FIGS. 1 and 2.

For the purpose of fastening the single belt band 12 to the retaining plate 17, it has a lower fastening loop 22 (see FIGS. 7 and 8) that is slid over the retaining plate 17 and the latter was subsequently screw-connected to the lower crosspiece 5. From the retaining plate 17, the single belt band 12 runs around the lower end 5a of the lower crosspiece 5 and which faces away from the upper guide frame 3 and is provided with a rounded return region 19, such that the check belt is routed without interfering contours—in particular edges, which could result in damage to the single belt band 12 upon movement of the single belt band 12 in this region—around the lower crosspiece 5. Then, after passing through a slot 28 in the lower crosspiece 5, it runs around the lower axle 9, after which, after again passing through the slot 28, it again goes back around the return region 19 of the lower crosspiece 5. From there, it goes back upwards, via the retaining plate 17, until it is connected, by its other end, the upper fastening region 25, as already described above, to the upper crosspiece 6. In this case, this connection in the upper fastening region 25 may be effected in the same way as the fastening in the lower fastening region 24—for example by realization of an upper fastening loop 23 (see FIGS. 7 and 8) that is slid over a further retaining plate (not visible in the figures), which is connected to the upper crosspiece 6.

By means of the fixed connection of the single belt band 12 to the lower crosspiece 5, the horizontal forces routed through the check belt from the upper guide frame 3 can be diverted to the left and right, directly from the lower guide frame 2, into the sliding seat guide 26, and thus into the vehicle floor.

The relative movement of the lower axle 9, which is a constituent part of the inner lever 7, and the wrap of the single belt band 12 is not subject to applied forces during travel, such that there are no effective impairments caused by wear that occurs as a result of movement.

Represented in FIGS. 5 and 6 is an embodiment of the check belt, as a double belt band 13, which is a modification of the design of the check belt as a single band 12. The following deals only with the differences in comparison with the single belt band 12 represented in FIGS. 3 and 4. For this purpose, it is expedient, firstly, to go into the design details of the two embodiments of the belt band 12, 13 of FIGS. 7 and 8.

The single belt band 12 already described above is turned over at both of its ends, such that an upper fastening loop 23 is realized at the left-hand end represented in FIGS. 7 and 8; for this purpose, the left-hand end of the single belt band 12 is sewn, in an upper seam region 21, to the single belt band 12. There is a similar design at the right-hand end: a lower fastening loop 22 is obtained in that the right-hand end is turned over and subsequently sewn in the region of a lower seam region 20. In contrast to this, the second embodiment example of the check belt is realized in the form of a double belt band 13. For this, the two ends of the double belt band 13 are turned over to the same side and connected to each other in a seam region 18. As a result, only a single loop 27 is obtained, and the upper fastening region 25 and the lower fastening region 24 are realized in the turned-over region.

As can be clearly seen in FIGS. 5 and 6, the double belt band 13, starting from its fastening in its lower fastening region 24 on the retaining plate 17, is routed in a double layer around the return region 19 of the lower crosspiece 5. It likewise passes in a double layer around the lower axle 9. In its subsequent course, the double belt band 13 again becomes double-layered around the return region 19, such that there it is four-layered. Then, after going upwardly past the retaining plate 17, it is likewise double-layered. It is connected, by its upper fastening region 25 (not visible in FIGS. 5 and 6), to the upper crosspiece 6, in the region of the fastening device 4 of the belt roller (as represented in FIG. 1 for the other embodiment example). This connection—embodiment example described—may be effected, for example, by means of a further retaining plate, on which the double belt band is suspended in its upper fastening region 25.

In comparison with the first embodiment example with a single belt band 12, the design of the second embodiment example with a double belt band 13 has the advantage that, owing to the double layer, greater forces can be absorbed and transferred. Moreover, in production, a seam has to be made only in one region. However, there is also a disadvantage: more material is required for the check belt.

In summary, it may be stated that, by means of the routing and design of the check belt, in combination with its fastening to the vertical suspension system 1 and the design of the return region 19 of the lower crosspiece 5, an effective restraint system is provided for the lower axle of the lever arrangement, on the fixed bearing side. The lower axle 9 in this case acts like a loose roller in a pulley, such that much greater forces can be absorbed and transferred than in the case of conventional vertical suspension systems, without requiring further add-on parts. The highly loaded part of the lower axle 9 is thereby also held very effectively in the vertical direction, and horizontally acting forces are absorbed proportionately. Detachment from the fixed bearings 10, 11 is prevented in an effective manner. In the case of the invention, the check belt acts and is used in multiple ways. By means of the check belt in the vertical suspension system 1, the already known travel limitation is obtained, and at the same time a reduction is achieved in the bend on the lower axle 9 of the inner lever 7. In the case of the fixed bearing disposed in the lower guide frame 2, component failure of the inner lever 7 is also prevented. Moreover, unlike check belts known from the state of the art, which transfer the reaction forces only vertically, the invention also achieves a restraining action for horizontally acting forces. By means of the invention, the transfer of force, and consequently the efficiency, of known vertical suspension systems is significantly improved; the additional benefit is achieved without use of additional components, and is therefore neutral with respect to weight. In addition, a device according to the invention is easily assembled, and the values for the forward displacement of a complete seat are reduced significantly.

LIST OF REFERENCES 1 vertical suspension system
2 lower guide frame
3 upper guide frame
4 fastening device for belt roller
5 lower crosspiece
6 upper crosspiece
7 inner lever
8 outer lever
9 lower axle
10 lower fixed bearing
11 upper fixed bearing
12 belt band (single)
13 belt band (double)
14 floating bearing
15 screwed connection
16 scissor joint
17 retaining element; retaining plate
18 seam region
19 return region
20 lower seam region
21 upper seam region
22 lower fastening loop
23 upper fastening loop
24 lower fastening region
25 upper fastening region
26 sliding seat guide
27 single loop
28 slot

The invention claimed is:

1. Vertical suspension system (1) for a vehicle seat having a lower guide frame (2) and an upper guide frame (3), between which there is disposed a lever arrangement that comprises an inner lever (7) and an outer lever (8), which are connected to each other via a scissor joint (16), wherein the inner lever (7) and the outer lever (8) are connected to the lower guide frame (2) and to the upper guide frame (3) in each case via floating bearings and fixed bearings (10, 11),
wherein realized on the lower guide frame (2) there is a lower crosspiece (5), which, at its lower end that faces away from the upper guide frame (3), has a rounded return region (19),
wherein the lower fixed bearing (10) has a lower axle (9), which extends parallel to the lower crosspiece (5) and is opposite thereto,
wherein realized on the upper guide frame (3) there is an upper crosspiece (6),
having a belt band (12; 13), which is fastened to the upper crosspiece (6) in an upper fastening region (25) and to the lower crosspiece (5) in a lower fastening region (24),
wherein the belt band (12; 13), in its lower fastening region (24), is realized in a form of a loop, and this lower fastening region (24) encompasses a retaining element (17), which is connected to the lower crosspiece (5),
wherein the belt band (12; 13), between its lower fastening region (24) and its upper fastening region (25), is routed via the return region (19) and encompasses the lower axle (9).

2. Vertical suspension system (1) according to claim 1, wherein the retaining element (17) is attached to a side that faces rearward away from the lower axle (9).

3. Vertical suspension system (1) according to claim 1, wherein the retaining element (17) is realized as a retaining plate, which is connected to the lower crosspiece (5) via a screwed connection (15) or rivets.

4. Vertical suspension system (1) according to claim 1, wherein the belt band (13) as a whole is realized as a single loop (27), in which two ends of the belt band (13) are inseparably connected to each other in a single seam region (18).

5. Vertical suspension system (1) according to claim 4, wherein the belt band (13) is two-fold routed around the lower axle (9) and between lower crosspiece (5) and upper crosspiece (6), and fourfold around the return region (19).

6. Vertical suspension system (1) according to claim 1, wherein the lower fastening region (24) of the belt band (12) is realized as a lower fastening loop (22) and the upper fastening region (25) of the belt band (12) is realized as an upper fastening loop (23), in that respective ends of the belt band (12) are inseparably connected to the belt band (12) in a lower seam region (20) and an upper seam region (21).

7. Vertical suspension system (1) according to claim 6, wherein the belt band (12) is routed only once, around the lower axle (9) and between lower crosspiece (5) and upper crosspiece (6), and doubled around the return region (19).

8. Vertical suspension system (1) according to claim 1, wherein the fixed bearings (10, 11) are disposed at rear in direction of travel.

* * * * *